US006971475B2

(12) United States Patent  (10) Patent No.: US 6,971,475 B2
Tompson et al.  (45) Date of Patent: Dec. 6, 2005

(54) VEHICLE TRIM COMPONENTS WITH SELECTIVELY APPLIED FOAM AND METHODS OF MAKING SAME

(75) Inventors: Graham Tompson, Northville, MI (US); Girma Gebreselassie, Southfield, MI (US); Anthony Messina, Royal Oak, MI (US)

(73) Assignee: Collins & Aikman Products Co., Troy, MI (US)

( * ) Notice: Subject to any disclaimer, the term of this patent is extended or adjusted under 35 U.S.C. 154(b) by 162 days.

(21) Appl. No.: 10/427,894

(22) Filed: May 1, 2003

(65) Prior Publication Data

US 2004/0216949 A1   Nov. 4, 2004

(51) Int. Cl.[7] .............................. F01N 1/24; E04B 2/02; E04B 1/74
(52) U.S. Cl. ...................... 181/204; 181/290; 181/296; 296/39.3
(58) Field of Search ................................ 181/204, 205, 181/290, 296; 296/70, 97.23, 39.3; 180/69.22, 180/69.23, 90; 428/138, 166; 264/255

(56) References Cited

U.S. PATENT DOCUMENTS

| | | | |
|---|---|---|---|
| 3,046,177 A | 7/1962 | Hankins ...................... 156/78 |
| 3,919,444 A | 11/1975 | Shayman ...................... 428/95 |
| 4,283,457 A | 8/1981 | Kolsky et al. .............. 428/285 |
| 4,405,393 A | 9/1983 | Tillotson ..................... 156/78 |
| 4,491,556 A | 1/1985 | Fujii et al. .................. 264/243 |
| 4,579,764 A | 4/1986 | Peoples, Jr. et al. .......... 428/95 |
| 4,828,898 A | 5/1989 | Bailey ......................... 428/88 |
| 4,952,358 A | 8/1990 | Okina et al. ................ 264/134 |
| 5,082,609 A * | 1/1992 | Rohrlach et al. ............ 264/255 |
| 5,082,716 A | 1/1992 | Satterfield et al. .......... 428/175 |
| 5,271,885 A | 12/1993 | Denker et al. .............. 264/46.5 |
| 5,486,398 A | 1/1996 | Weber et al. .................. 428/95 |
| 5,512,233 A | 4/1996 | Gallagher et al. ........... 264/321 |
| 5,922,265 A | 7/1999 | Parekh ........................ 264/257 |
| 5,942,321 A | 8/1999 | Romesberg et al. ...... 428/300.7 |
| 6,024,190 A * | 2/2000 | Ritzema ...................... 181/286 |
| 6,071,619 A | 6/2000 | DeWinter ................. 428/423.1 |
| 6,171,419 B1 | 1/2001 | Heiman et al. ................ 156/78 |
| 6,335,379 B1 | 1/2002 | Leenslag et al. ............. 521/174 |
| 6,631,785 B2 * | 10/2003 | Khambete et al. ........... 181/290 |
| 6,695,374 B1 * | 2/2004 | Gebreselassie et al. ..... 296/39.3 |
| 6,755,997 B2 * | 6/2004 | Gebreselassie et al. ..... 264/255 |
| 6,802,389 B2 * | 10/2004 | Tompson et al. ............ 181/290 |
| 2003/0096079 A1 * | 5/2003 | Messina et al. .............. 428/172 |
| 2004/0075290 A1 * | 4/2004 | Campbell .................... 296/39.3 |
| 2004/0129493 A1 * | 7/2004 | Campbell .................... 181/204 |

OTHER PUBLICATIONS

International Search Report corresponding to PCT/US2004/013824, dated Mar. 18, 2005.

* cited by examiner

*Primary Examiner*—Edgardo San Martin
(74) *Attorney, Agent, or Firm*—Myers Bigel Sibley & Sajovec

(57) ABSTRACT

Vehicle trim components are formed by applying a layer of material onto a mold surface and then selectively applying foam prior to molding operations. Selectively applying foam may include applying foam of different densities in multiple locations and/or applying foam of different thicknesses in multiple locations. The material and foam are subjected to conditions within the mold to produce a trim component having a desired shape. Once de-molded, barrier material may be added and various post-molding operations may be conducted.

27 Claims, 3 Drawing Sheets

VEHICLE TRIM COMPONENTS WITH SELECTIVELY APPLIED FOAM AND METHODS OF MAKING SAME

FIELD OF THE INVENTION

The present invention relates generally to vehicles and, more particularly, to vehicle trim components.

BACKGROUND OF THE INVENTION

It is generally considered desirable to reduce the level of noise within passenger compartments of vehicles, such as automobiles. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in the dashboard, in conjunction with carpeting for floor panels, in the wheel wells, in the trunk compartment, under the hood, and as part of the headliner.

Vehicle trim components are conventionally molded into a non-planar three dimensional contoured configuration which conforms to the contours of a particular portion of a vehicle interior so as to fit properly. One or more layers of cast foam are conventionally attached to these various trim components to improve the acoustic performance (i.e., to reduce noise within a vehicle passenger compartment) of the component.

In general, the ability of conventional materials to attenuate sound increases as the amount of material increases. Unfortunately, increased materials often increases the weight of sound attenuating material, which may be undesirable. Accordingly, there is a continuing need for acoustical insulation materials for use within vehicles that exhibit superior sound attenuating properties, while also being lightweight and low in cost.

Recently, a lot of emphasis has been placed on the acoustic properties of vehicle trim components, such as carpeting and dash insulators, because of customer requirements for quieter passenger compartments. Carpeting used to cover the floor areas of vehicles, such as automobiles, is conventionally molded into a non-planar three dimensional contoured configuration which conforms to the contours of the vehicle floor so as to fit properly. Dash insulators are mounted to a vehicle firewall which separates the passenger compartment from an engine compartment. Dash insulators are designed to reduce the transmission of noise and heat from the engine compartment into the passenger compartment.

A fibrous or foam layer of material referred to as a decoupler is typically attached to the backside of various trim components, such as vehicle dash insulators and carpeting, to absorb sound. Decouplers can be required to have complex shapes and configurations and, as such, can be time consuming and expensive to manufacture. Vehicle manufacturers are continuously looking for ways to reduce costs and complexity associated with vehicle manufacturing. Moreover, vehicle manufacturers are continuously looking for ways to reduce noise within passenger compartments while reducing weight of trim components.

SUMMARY OF THE INVENTION

In view of the above discussion, trim components for use within vehicles, and methods of producing same, are provided. According to embodiments of the present invention, a layer or substrate of material (e.g., thermoplastic material, thermosetting material, etc.) is applied onto a mold surface. The final product of this substrate may be virtually any type of vehicle component, such as carpeting, dashboard, door panel, etc. One or more layers of barrier material may be selectively applied to portions of the layer of polymeric material. Foam, such as polyurethane foam, is then selectively applied (e.g., via spraying or other application techniques) to the layer of material only in locations identified as requiring enhanced sound attenuation.

If barrier material has been added to the layer of material, foam may be applied to the barrier material and/or to exposed portions of the layer of material. Selectively applying foam to the layer of material may include applying foam of different densities in multiple locations and/or applying foam of different thicknesses in multiple locations. Accordingly, embodiments of the present invention facilitate adding additional foam and/or different types of foam to areas identified as requiring additional sound attenuation characteristics.

The material and foam are then subjected to conditions within the mold to produce a trim component having a desired shape. Once de-molded, barrier material may be added to the surface of the material layer, if desired. In addition, the trim component may be subjected to various post-molding operations, and upholstery material may be attached to the surface of the material layer opposite from the foam.

Trim components according to embodiments of the present invention can provide desired attenuating properties in selected vehicle locations, such as floor pans, door panels, firewalls, headliners, spare tire covers, etc. Moreover, trim components according to embodiments of the present invention may have reduced overall weight without sacrificing acoustic properties.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figures 1, 2:
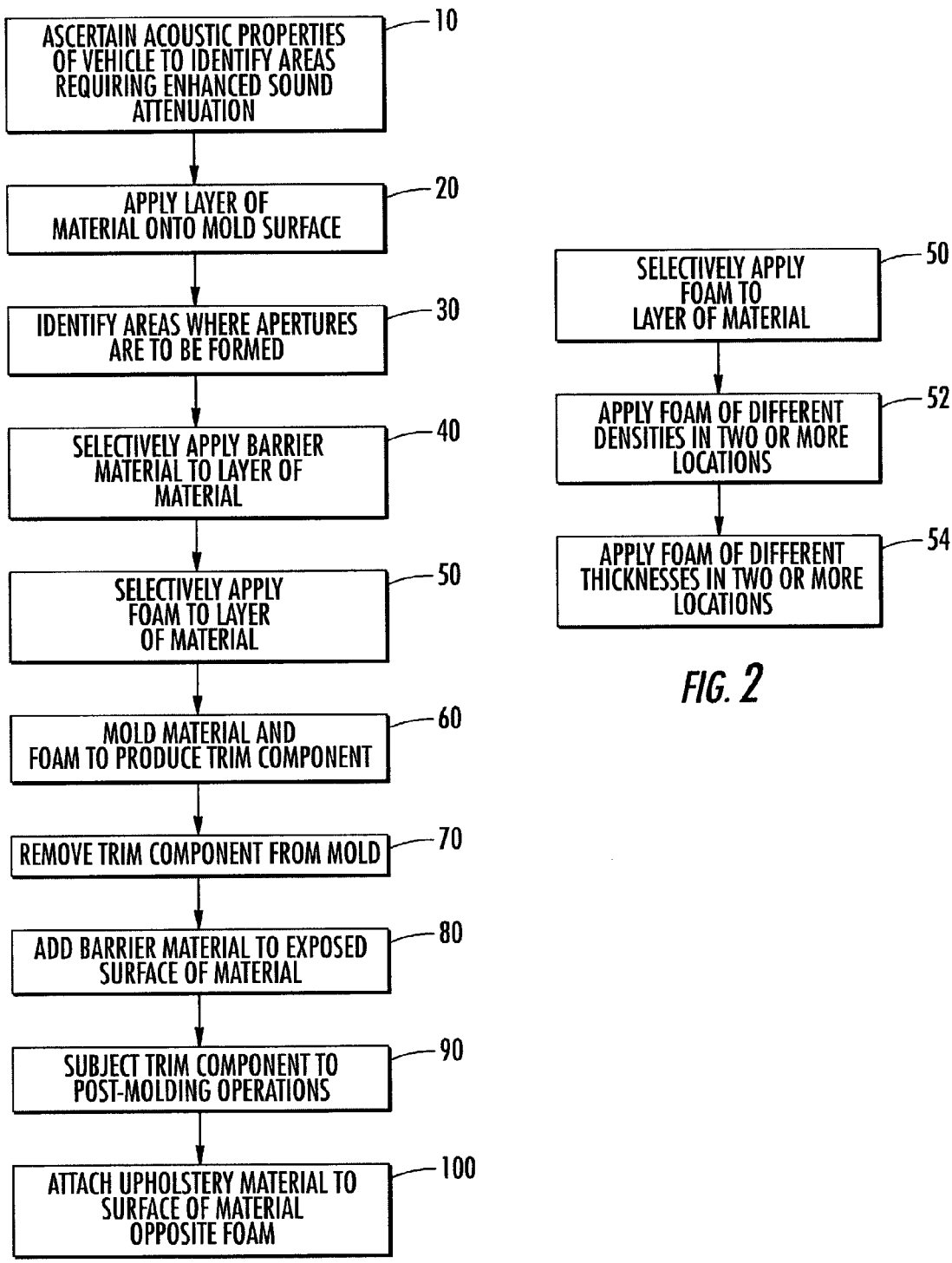
FIGS. 1–2 are flowcharts of operations for producing vehicle trim components, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide acoustically enhanced trim components for use in various applications, particularly automotive applications. Exemplary automotive applications within which trim components according to embodiments of the present invention may be utilized include, but are not limited to, floor coverings, door panels, dash insulators, trunk liners, headliners, A-pillar panels, various interior trim components, etc.

Referring to FIG. 1, operations for forming vehicle trim components, according to embodiments of the present invention, are illustrated. The acoustic properties of a portion of a vehicle on which a trim component is to be placed are ascertained to identify areas requiring enhanced sound attenuation. (Block 10). Acoustic properties of a vehicle, and portions thereof, may be ascertained by identifying areas through which sound within a predetermined frequency range passes at an intensity level that exceeds a threshold intensity level. Identifying areas of a vehicle through which sound within a predetermined frequency range passes at an intensity level that exceeds a threshold intensity level may include generating one or more sound intensity maps of the vehicle or portions thereof. Sound intensity maps are well understood by those skilled in the art and need not be described further herein.

A layer of material that is to serve as the skin and/or supporting substrate is applied onto a mold surface (Block 20). The material may be any type of thermoformable material including, but not limited to thermosetting polymeric material, thermoplastic polymeric material, foam, massback, and other thermoformable fibrous materials including those derived from natural and synthetic fibers. Massback is a relatively dense material, normally impermeable to air and thermoformable. Massback can be formed from virtually any plastic or rubber material which contains a high-mass filler material. An exemplary massback includes ethylene-vinylacetate (EVA) copolymer, polyethylene, or polyvinyl-chloride (PVC), and a high-mass filler material, such as glass, calcium carbonate or barium sulfate, added to increase the mass. Other suitable polymeric materials include thermoformable stiff thermoplastic materials such as polystyrene, polyphenyl sulfide and polycarbonate, fiber-reinforced thermoplastics and fiber-reinforced thermosets such as epoxies, phenolics and the like.

Areas of the layer in which apertures (e.g., pass-throughs, etc.) are to be formed therethrough may be identified (Block 30). One or more layers of barrier material may be selectively applied to portions of the layer of material (Block 40).

Foam, such as polyurethane foam, polypropylene foam, polyethylene foam, polyvinylchloride foam, any kind of polyolefin foam, polyester foam, etc., is then selectively applied (e.g. via spraying or other application techniques) to the layer of material. Additional foam may be applied in locations identified as corresponding to areas of a vehicle identified as requiring enhanced sound attenuation (Block 50). Alternatively, foam may be applied only in areas identified as requiring enhanced sound attenuation. The foam serves the function of a decoupler and absorbs sound. In addition, the foam provides a cushioning function.

If barrier material has been added to the layer of material, foam may be applied to the barrier material and/or to exposed portions of the layer of polymeric material. Areas of the substrate in which apertures are to be formed therethrough are typically avoided during the application of the foam.

Referring to FIG. 2, selectively applying foam to the layer of material (Block 50) may include applying foam of different densities in two or more locations (Block 52) and/or applying foam of different thicknesses in two or more locations (Block 54). Accordingly, embodiments of the present invention facilitate adding additional foam and/or different types of foam to areas identified as requiring additional sound attenuation characteristics.

Referring back to FIG. 1, the material and foam are then subjected to conditions within the mold to produce a trim component having a desired shape (Block 60). The trim component is then removed from the mold (Block 70). Once de-molded, barrier material may be added to the surface of the material layer opposite from the foam (Block 80), if desired. Barrier material utilized in accordance with embodiments of the present invention is a non-porous material such as polyurethane and is configured to attenuate sound. Barrier material may have various densities and thicknesses. Furthermore, barrier material may include between about 0% and 50% filler, such as calcium carbonate, calcium hydroxide, aluminum trihydrate, talc, bentonite, barytes, silica, clay and mica. Exemplary filled and unfilled polyurethane barrier materials that may be used in accordance with embodiments of the present invention include Bayer Elastomer Baytek 086-A (Bayer AG, Pittsburgh, Pa.).

The de-molded trim component may then be subjected to various post-molding operations (e.g., trimming, finishing, etc.) (Block 90), and upholstery material may be attached to the surface of the polymeric material layer opposite from the thermoformable foam (Block 100).

According to embodiments of the present invention, various ones of the operations illustrated in FIGS. 1–2 may be performed out of the illustrated order For example, barrier material may be added to a trim component after molding operations. Upholstery material may be added to a trim component prior to molding operations, etc. Furthermore, operations represented by Blocks 10 through 100 may be performed substantially simultaneously. For example, foam of different densities may be applied simultaneously with the application of foam of different thicknesses. In addition, one or more operations illustrated in FIGS. 1–2 may be eliminated. For example, a barrier material may not be applied to a do-molded trim component, etc.

Trim components according to the present invention may be configured to be attached to virtually any type of vehicle component/panel (e.g., floor panel, firewall, door panel, wheel well, trunk compartment panel, etc.). For example, a trim component according to embodiments of the present invention may be utilized as a dash insulator when attached to a vehicle firewall, may be utilized as a floor covering when attached to vehicle floor panels, and may be utilized as virtually any type of vehicle interior trim component.

Vehicle panels to which trim components according to the present invention may be attached may have various shapes, configurations, and sizes, and may be formed of various materials including, but not limited to metals, polymers, and combinations thereof. For example, a vehicle panel may be sheet metal having a three-dimensional configuration. Alternatively, a vehicle panel may be a substantially flat piece of sheet metal.

The material to which foam is attached may be any of various types of thermoformable materials, including those derived from natural and synthetic fibers. Moreover, the material may be preformed into a three-dimensional shape. The material can have form retention characteristics such that it maintains a form imposed upon it during molding operations. Alternatively, the material may have elastic memory such that it is unable to maintain an unassisted non-flat configuration. For materials having elastic memory, foam attached thereto may also serve the function of a binder such that the material can maintain a shape imposed upon it via molding and other operations.

Figure 3A:
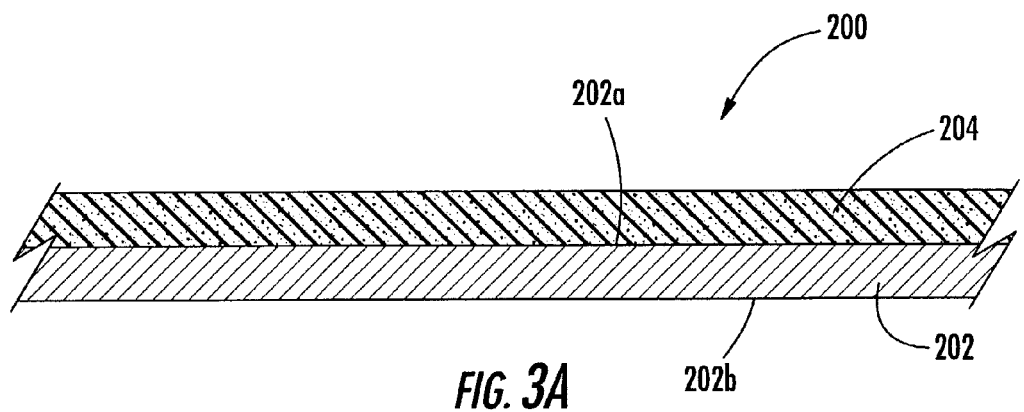
FIGS. 3A–3F are cross-sectional views of portions of trim components produced in accordance with embodiments of the present invention.
Figure 3B:
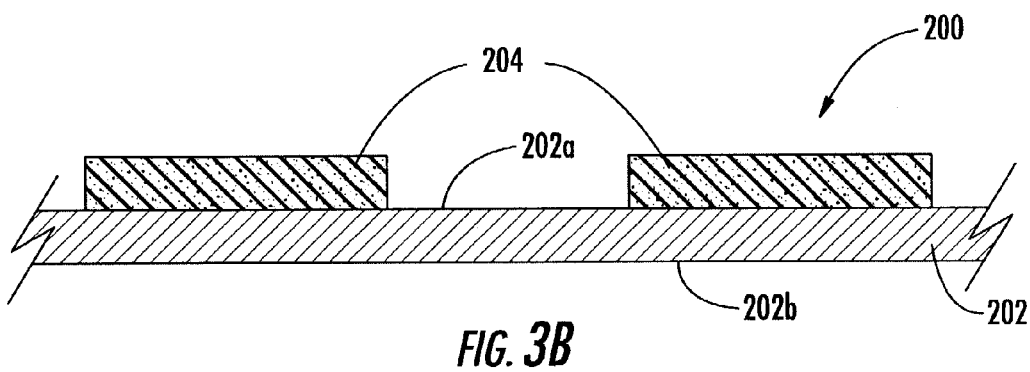

Referring to FIGS. 3A–3F, section views of portions of exemplary trim components produced according to embodiments of the present invention, are illustrated. In FIG. 3A, a trim component 200 includes a layer of polymeric material 202 having opposite first and second surfaces 202a, 202b. An acoustically absorbing foam material 204 (such as polyurethane foam) is selectively attached to the polymeric material first surface 202a. Although illustrated in a single location, embodiments of the present invention include foam material 204 applied to multiple selected locations, as illustrated in FIG. 3B.

Figure 3C:
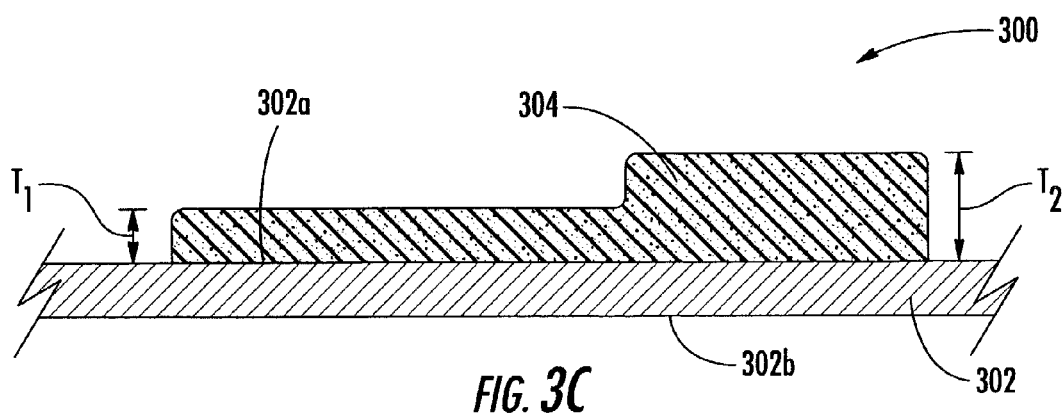

In FIG. 3C, a trim component 300 includes a layer of polymeric material 302 having opposite first and second surfaces 302a, 302b. An acoustically absorbing foam material 304 (such as polyurethane foam) is selectively attached to the polymeric material first surface 302a with different thicknesses $T_1$, $T_2$ in different locations on the polymeric material.

Figure 3D:
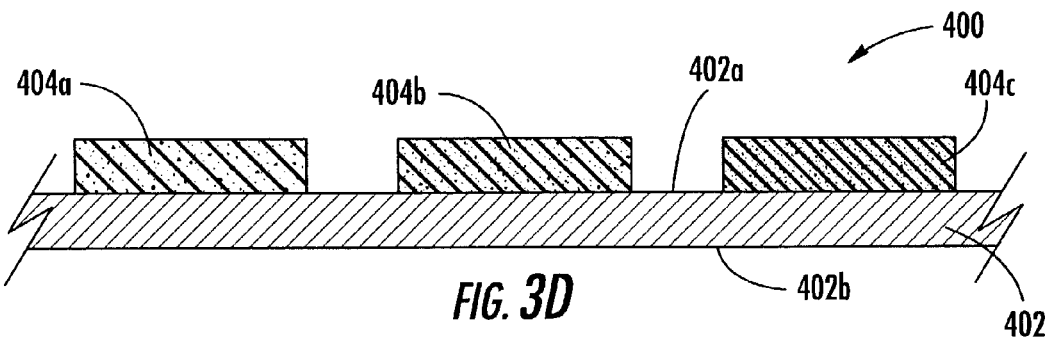

In FIG. 3D, a trim component 400 includes a layer of polymeric material 402 having opposite first and second surfaces 402a, 402b. Acoustically absorbing foam material 404a, 404b, 404c (such as polyurethane foam) is selectively attached to the polymeric material first surface 402a in respective locations. In the illustrated embodiment, foam 404a is a low density foam, foam 404b is a medium density foam, and foam 404c is a high density foam. Foams having densities within the range of 0.5 pounds per cubic foot (PCF) to 4.0 PCF may be utilized. According to embodiments of the present invention, foams of different densities can be selectively applied to various locations and in various patterns and configurations prior to molding operations.

Figure 3E:
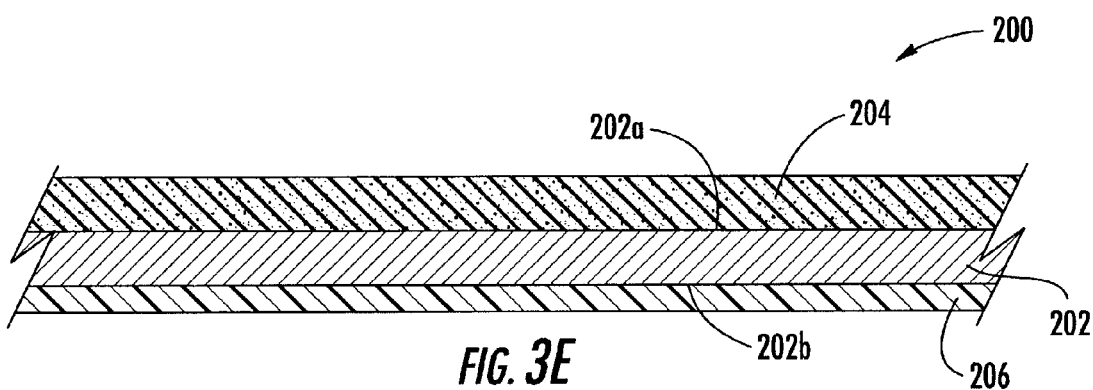
Figure 3F:
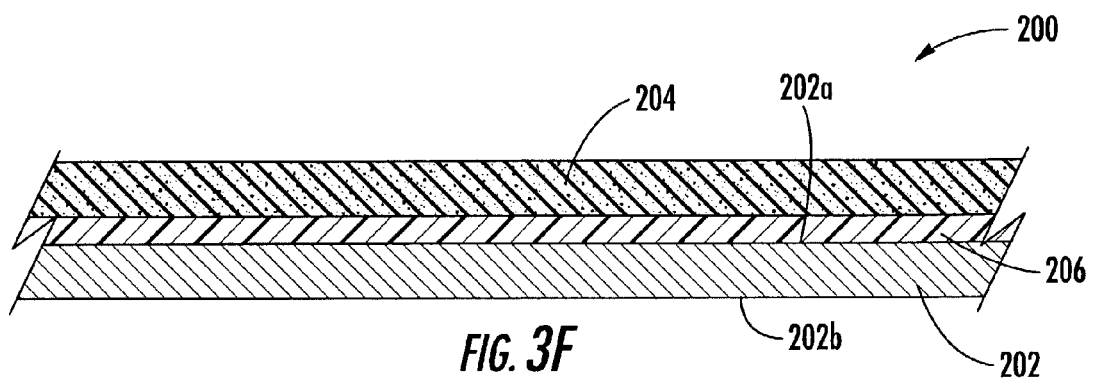

In FIG. 3E, the trim component 200 of FIG. 3A is illustrated with a layer of barrier material 206 applied to the polymeric material second surface 202b. In FIG. 3F, the trim component 200 of FIG. 3A is illustrated with a layer of barrier material 206 applied to the polymeric material first surface 202a with foam 204 selectively applied to the barrier layer 206. Barrier material may be applied to various locations on the polymeric material 202 and in various patterns and configurations. For example, barrier material 206 may be applied to portions of the polymeric material first surface 202a and foam may be selectively applied to portions of the barrier material 206 and to exposed portions of the polymeric material first surface 202a.

Vehicle trim components according to the various embodiments of the present invention facilitate acoustical "tuning" wherein acoustical "hot spots" can be identified and additional foam material can be added to attenuate sound without increasing weight and costs. Trim components according to embodiments of the present invention can be "tuned" to provide desired sound attenuating characteristics in selected vehicle locations, such as floor panels, firewalls, door panels, wheel wells, trunk compartment panels, etc. The term "tuned" means that portions of a trim component can be formed to have a specific acoustic impedance designed to attenuate sound in one or more frequencies or frequency bands, and/or to have a specific absorption characteristic designed to absorb sound in one or more frequencies or frequency bands. Moreover, trim components according to embodiments of the present invention may have reduced overall weight compared with conventional sound proofing materials, and without sacrificing sound attenuation properties.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of forming a vehicle trim component, comprising:
   ascertaining acoustic properties of a portion of a vehicle on which the trim component is to be placed to identify one or more areas of the vehicle requiring enhanced sound attenuation;
   applying a layer of material onto a mold surface;
   selectively applying foam having a first density in a first selected location and selectively applying foam having a different second density in a second selected location and such that the foam is completely in contact with the layer of material at the first and second locations, wherein the first and second locations correspond to the one or more areas of the vehicle identified as requiring enhanced sound attenuation;
   subjecting the material and foam to conditions within the mold to produce a trim component having a desired shape; and
   removing the trim component from the mold.

2. The method of claim 1, wherein ascertaining acoustic properties of a portion of a vehicle comprises generating a sound intensity map of the portion of the vehicle.

3. The method of claim 1, wherein ascertaining acoustic properties of a portion of a vehicle comprises identifying areas of the vehicle through which sound within a predetermined frequency range passes at an intensity level that exceeds a threshold intensity level.

4. The method of claim 1, wherein the foam comprises polyurethane foam.

5. The method of claim 1, wherein the step of selectively applying foam comprises selectively spraying the foam on the layer of material in the one or more locations.

6. The method of claim 1, further comprising subjecting the trim component to post-molding operations.

7. The method of claim 1, further comprising applying a layer of barrier material onto the layer of material, and wherein the step of selectively applying foam comprises selectively applying foam at one or more locations on the barrier material and on one or more exposed portions of the layer of material.

8. The method of claim 1, wherein the step of selectively applying foam comprises selectively applying foam having a first thickness in a first selected location and selectively applying foam having a different second thickness in a second selected location.

9. The method of claim 1, further comprising applying a layer of barrier material onto a side of the material opposite from the foam after removing the trim component from the mold.

10. The method of claim 1, further comprising attaching upholstery material onto a side of the material opposite from the foam after removing the trim component from the mold.

11. A method of forming a vehicle trim component, comprising:
- ascertaining acoustic properties of a portion of a vehicle on which the trim component is to be placed to identify one or more areas of the vehicle requiring enhanced sound attenuation;
- applying a layer of polymeric material onto a mold surface;
- applying a layer of barrier material onto the layer of polymeric material;
- selectively applying foam on selective portions of the barrier material and selective exposed portions of the layer of polymeric material, wherein the selective portions of the barrier material and selective exposed portions of the layer of polymeric material correspond to areas of the vehicle identified as requiring enhanced sound attenuation, wherein the foam applied has different densities in two or more locations, and wherein the foam applied has different thicknesses in two or more locations;
- subjecting the polymeric material and foam to conditions within the mold to produce a trim component having a desired shape; and
- removing the trim component from the mold.

12. The method of claim 11, wherein ascertaining acoustic properties of a portion of a vehicle comprises generating a sound intensity map of the portion of the vehicle.

13. The method of claim 11, wherein ascertaining acoustic properties of a portion of a vehicle comprises identifying areas of the vehicle through which sound within a predetermined frequency range passes at an intensity level that exceeds a threshold intensity level.

14. The method of claim 11, wherein the foam comprises polyurethane foam.

15. The method of claim 11, wherein the step of selectively applying foam comprises selectively spraying the foam on the layer of polymeric material in a plurality of identified locations.

16. The method of claim 11, further comprising subjecting the trim component to post-molding operations.

17. The method of claim 11, further comprising applying a layer of barrier material onto the layer opposite from the foam after removing the trim component from the mold.

18. The method of claim 11, further comprising attaching upholstery material onto a side of the polymeric material opposite from the foam after removing the trim component from the mold.

19. A vehicle trim component, comprising:
- a substrate configured to be attached to a vehicle portion in face-to-face relationship therewith, wherein the substrate comprises opposite first and second surfaces; and
- foam applied to the substrate first surface in selective locations, wherein selective locations correspond to portions of a vehicle identified as requiring enhanced sound attenuation, wherein the foam has a first density in a first location and a different second density in a second location, and wherein the foam is completely in contact with the substrate at the selective locations.

20. The vehicle trim component of claim 19, wherein the foam comprises polyurethane foam.

21. The vehicle trim component of claim 19, further comprising a barrier material on the substrate second surface.

22. The vehicle trim component of claim 19, further comprising a barrier material between the substrate first surface and the foam.

23. The vehicle trim component of claim 19, wherein the foam has a first thickness in a first location and a different second thickness in a second location.

24. The vehicle trim component of claim 19, further comprising upholstery material on the substrate second surface.

25. The vehicle trim component of claim 19, wherein the vehicle portion is a vehicle firewall and the trim component is a dashboard insulator.

26. The vehicle trim component of claim 19, wherein the vehicle portion is a vehicle floor and the trim component is a floor covering.

27. The vehicle trim component of claim 19, wherein the vehicle portion is an interior panel and the trim component is an interior trim component.

* * * * *